137-13 SEARCH ROOM

June 29, 1965 W. G. WADEY 3,191,860

FLUID LOGIC CONTROL

Filed Jan. 30, 1963 2 Sheets-Sheet 1

INVENTOR.
WALTER G. WADEY
BY Griffin and Stokes
ATTORNEYS

United States Patent Office 3,191,860

Patented June 29, 1965

3,191,860
FLUID LOGIC CONTROL

Walter G. Wadey, Bethesda, Md., assignor to Sperry Rand Corporation, New York, N.Y., a corporation of Delaware Filed Jan. 30, 1963, Ser. No. 255,052
8 Claims. (Cl. 235—201)

The present invention relates to a method and means for controlling digital, fluid-actuated systems. More particularly, the present invention relates to a method and means for controlling the generation of timing pulses at a frequency dependent upon the rate at which said pulses can be propagated through the system. The invention provides a clock pulse generator for controlling the logic circuits in a digital, fluid-actuated system, said clock pulse generator being responsive to changes in the environment of the logic circuits for changing the rate at which clock pulses are generated. This application is a continuation in part of my copending application Serial No. 59,959 filed October 3, 1960, now abandoned.

As is well known to those familiar with digital data processing systems, some means is usually provided for synchronizing the logical operations performed by the system so that the various operations occur in a time ordered sequence with respect to each other. This means usually takes the form of a pulse generator which produces a sequence of discrete pulses each separated from the other by a predetermined interval of time. These pulses are called timing or clock pulses. Also, it is well known that pulses take a discrete interval of time to travel from one logical element to another, this interval of time depending upon the environmental conditions of the system. Further, the response time of the various components varies as the environmental conditions vary. Stated differently, the maximum rate at which the logical components may receive signals, and still respond correctly to those signals, varies as the environmental conditions vary. Thus, it is necessary to either prevent the environmental conditions from changing or else change the pulse generator frequency as the environment changes so that the pulse generator always produces clock pulses as fast as the system can accept them but not so fast that the system cannot correctly respond to them.

With the advent of the fluid amplifier and its application to logic circuits in digital control systems, a need developed for a clock pulse generator which could compensate for ambient conditions in the system environment. For example, it is known that the velocity of signal propagation through a medium is dependent on the temperature of the medium. To compensate for variations in fluid signal velocity, the present invention varies the clock pulse frequency.

Furthermore, changes in temperature and humidity affect the physical properties of the system components thus causing marked changes in the geometrical configuration of the passageways through which the fluid flows. These changes also produce variations in the rate of signal propagation and in accordance with the present invention, are compensated for by varying the frequency at which clock pulses are generated.

In control systems of the prior art, attempts have been made to correct for ambient conditions by changing the clock pulse frequency. Referring to FIGURE 3, these devices include a fluid clock pulse generator 1′ which emits clock pulses that are applied to an open-ended transmission line 3′. Sensing elements located at strategic points about the system sense changes in the environment of the systems and control a temperature-humidity compensator 4 which adjusts the rate at which the clock pulse generator produces pulses. This method of compensation has certain disadvantages. For example, the sensing elements can sense conditions only at certain points or within a given radius of their location. Also, since the passageways carrying the fluid pulses may be quite small the sensing elements cannot be placed within them so there are gaps or spaces between the passageways and the sensing elements. This results in an inaccurate or delayed sensing of the true conditions. In this device sensors sense environmental conditions rather than the actual velocity of pulses subjected to said conditions.

Therefore, an object of this invention is to provide a method and means for directly sensing the effect of ambient conditions on the velocity of signal propagation through a fluid operated system and adjusting the clock pulse rate according to the rate at which clock pulses are propagated through the system.

An object of this invention is to provide a device responsive to output signals from a clock pulse generator for sensing the effect of environmental conditions of a fluid system on the rate of propagation of fluid signals and controlling the rate of emission of clock pulses to the system in accordance with the effect sensed.

A further object of this invention is to provide a closed loop transmission path disposed about an enclosed system for directly determining the effect of ambient conditions on the rate of signal propagation through said system, said closed loop transmission path controlling the frequency of a clock pulse generator which applies clock pulses to the system.

A further object of the invention is to provide a clock pulse generator for generating timing pulses for a digital logic system, said clock pulse generator comprising an oscillator having a feedback path disposed in close proximity to logical elements of said system whereby the rate of pulse propagation through said feedback path and thus the rate of clock pulse generation is varied as the environmental conditions of said system vary.

The above stated objects are accomplished in one embodiment of the invention by providing the fluid operated system with a clock pulse generator for generating the clock pulses for timing the operations of the system. The clock pulse generator has an output connected to a fluid transmission line and an input responsive to signals which have been applied to and have traversed the transmission line, thus comprising a feedback oscillator. The transmission line is purposely disposed about the sytsem so that it is responsive to changes in the environmental conditions which affect the rate of pulse propagation through the system. With the feedback path or transmission line responsive to environmental conditions the frequency of the oscillator varies at the same time the environmental conditions vary the rate of pulse propagation through the system.

Other objects of the present invention and its mode of operation will become apparent upon consideration of the following description and the accompanying drawings in which.

Figure 1:
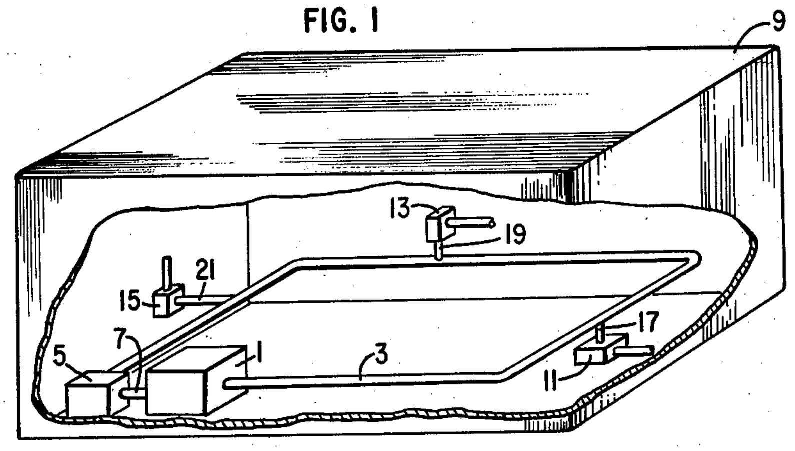
FIGURE 1 is a pictorial view illustrating the principle of operation of the present invention.
Figure 2:
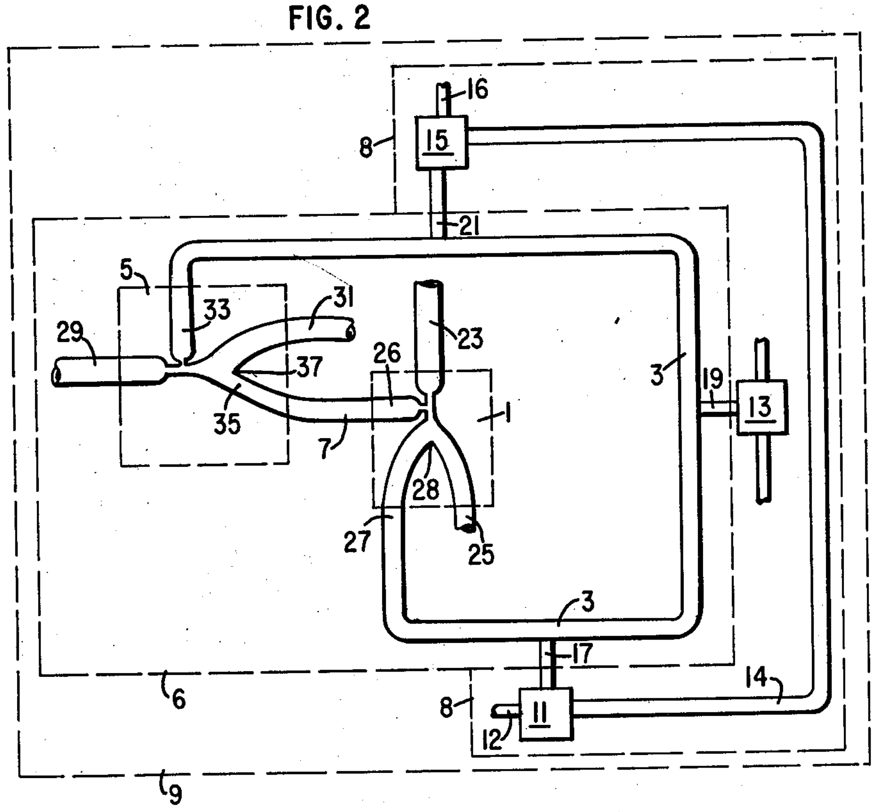
FIGURE 2 shows one embodiment or apparatus for practicing the invention.

Referring now to FIGURES 1 and 2, the apparatus according to the present invention comprises an oscillator 6 and a fluid logic system 8 disposed within an enclosure 9. Since fluid logic elements may comprise fluid passageways formed within a solid body, the term enclosure as used herein is intended to cover substantially solid bodies as well as cabinet type enclosures.

The fluid logic system is symbolically represented by fluid logical elements 11, 13 and 15. It should be understood that the present invention is suitable for use with different fluid logic systems employing large numbers of fluid logical elements which perform logical functions such as AND, OR, NOT and INHIBIT. Thus, elements 11, 13 and 15 symbolically represent a computer, data processing system, control device, or other logic system and a particular interconnection between these elements is shown in FIGURE 2 only for the purpose of explaining the advantages of the present invention.

The oscillator comprises a clock pulse generator 1, a transmission line or fluid clock pulse feedback path 3, a fluid amplifier 5 and a fluid duct 7. Transmission line 3 receives fluid clock pulses from the clock pulse generator and distributes them to the fluid logic system 8 over ducts 17, 19 and 21. After the clock pulses traverse the transmission line they are amplified by amplifier 5 and applied over duct 7 to the clock pulse generator to control the generation of the next clock pulse. Thus, transmission line 3 comprises the feedback path for the oscillator.

As shown in FIGURE 1, the transmission line winds about the logic system within enclosure 9 so that it is subjected to the same environmental conditions as the logical elements and connecting ducts of the logic system. Thus, if an environmental condition changes so that it takes longer for a fluid signal to travel from 11 to 15 this same condition slows down the clock pulse travelling through the transmission line. Conversely, if an environmental condition changes so that it takes less time for a fluid signal to travel from 11 to 15, the condition causes the clock pulse to travel through the transmission line at a faster rate. The result is that the frequency of the clock pulse generator is varied so that it produces clock pulses only as fast as they can be used by the logical system. The reason for this is subsequently explained in detail.

Referring now to FIGURE 2, the clock pulse generator is a fluid amplifier having a power stream input duct 23, a fluid return duct 25, a control signal input duct 26 and a clock pulse output duct 27. The power stream input duct is preferably connected to a means such as a compressor for supplying a continuous fluid stream under substantially constant pressure. Ducts 25 and 27 and partition 28 are arranged with partition 28 offset to one side of the path of the power stream emerging from duct 23 so that a power stream applied to duct 23 normally flows through the amplifier and into the clock pulse output duct 27.

The power stream entering the amplifier from duct 23 may be selectively deflected so that it flows from duct 23 into the fluid return duct 25. This is accomplished by applying a fluid control signal to the control signal input duct 26. Upon initiation of the fluid control signal a fluid stream enters the amplifier from duct 26 and strikes and exerts a force against the power stream thus deflecting it into fluid return duct 25. The duct 25 may be connected to the fluid return side of the power stream source. When the control signal applied to input duct 26 is terminated the fluid stream no longer strikes the power stream so the power stream returns to its normal path and flows from duct 23 into clock pulse output duct 27. A further description of fluid logic elements may be had by reference to pages 15 and 19 of the April 1960 issue of the publication "Automatic Control" and pages 81 to 84 of the June 1960 issue of "Science and Mechanics."

The fluid amplifier 5 comprises a power stream input duct 29, a fluid return duct 31, a control signal input duct 33 and an output signal duct 35. The power stream input duct 29 is preferably connected to a source for supplying a continuous stream of fluid under substantially constant pressure. This source may be the same source as that which supplies the power stream to duct 23. The ducts 31 and 35 and partition 37 are arranged with partition 37 offset to one side of the path of the power stream emerging from duct 29 so that the power stream applied to duct 29 normally flows through the amplifier and into the fluid return duct 31. The fluid return duct 31 may be connected to the fluid return side of the power stream source.

The power stream entering amplifier 5 may be deflected so that it flows into output signal duct 35. This is accomplished by applying a fluid control signal to control signal input duct 33. When the control signal is applied, a fluid control stream enters the amplifier from duct 33 to strike and exert a force on the power stream entering the amplifier from power stream input duct 29. This deflects the power stream so that it flows into output signal duct 35. When the fluid control signal applied to duct 33 is terminated the fluid control stream no longer strikes the power stream so that power stream returns to its normal path and flows from power stream input duct 29 to fluid return duct 31.

The transmission line or feedback path 3 is connected between the clock pulse signal output duct 27 and the control signal input duct 33 for the purpose of conveying fluid clock pulses from the clock pulse generator 1 to the amplifier 5. The output signal duct 35 is connected to duct 7 having its other end connected to control signal input duct 26.

The oscillator functions as follows. Assume the power streams have just been applied to ducts 29 and 33. Because of the position of partition 37 the power stream emerging from duct 29 flows into fluid return duct 31 and performs no useful function at this time. However, because of the position of partition 28 the power stream emerging from duct 23 flows into clock pulse output channel 27. Prior to this time there has been negligible fluid flow in transmission line 3 and the total pressure of the fluid in the transmission line has been some value $P^1$ where $P^1$ represents the sum of the static and dynamic pressures.

When the power stream flows into duct 27 it enters transmission line 3 as a stream of fluid having a total pressure $P^2$ where $P^2$ is greater than $P^1$ and represents the sum of the static and dynamic pressures of the fluid stream. The presence of the fluid stream having a total pressure $P^2$ represents the presence of a clock pulse.

The total pressure in transmission line 3 does not increase to the value $P^2$ instantaneously along the entire length of the line. Because of various factors such as mass, density, compressibility, etc., there is a delay between the time the pressure in the transmission line increases to $P^2$ at the output of pulse generator 1 and the time the pressure increases to the value $P^2$ at the point where the transmission line connects the control signal input duct 33. During this delay the clock pulse progresses along the length of the transmission line 3 and becomes evident at successive times at ducts 17, 19, 21 and 33.

After the clock pulse has traversed the transmission line it enters control signal input duct 33 and causes a fluid stream to enter amplifier 5 and strike the power stream. This deflects the power stream away from fluid return duct 31 so that the power stream now flows from duct 29 into signal output duct 35. The power stream from duct 29 passes through ducts 35, 7 and 26 and strikes the power stream flowing from duct 23 to duct 27. This deflects the power stream of pulse generator 1 so that the power stream now flows from duct 23 into fluid return duct 25.

When the power stream is deflected from duct 27 to duct 25 fluid stops flowing into duct 27. This designates the end of the clock pulse. With no fluid applied thereto the total pressure in duct 27 drops back to $P^1$. As before, the change in fluid flow in duct 27 does not instantaneously change the pressure at all points along the length of transmission line 3. This is due in part to the momentum of the fluid stream flowing in the transmission line at the time generator 1 stops producing a clock pulse. Accordingly, when the power stream stops flowing into duct 27 there is a time delay before the last fluid entering the duct passes through the transmission line and is applied to duct 33.

After this delay, fluid ceases flowing into amplifier 5 through duct 33 to deflect the power stream. Since the power stream no longer has a force acting against it, it returns to the normal flow path and flows from duct 29 into fluid return duct 31.

The last of the fluid entering duct 37 before amplifier 5 returns to normal traverses ducts 7 and 26 and continues the deflection of the power stream of generator 1. When the fluid stops flowing into duct 26 there is nothing to deflect the power stream of the generator into the fluid return duct 25. At this time the power stream entering the pulse generator through duct 23 returns to its normal path of flow and flows through duct 27 into the transmission line. At this point the total pressure at the input end of transmission line 3 again increases to the value $P^2$ to indicate that a clock pulse is passing through this portion of the line.

The sequence of events described above constitutes one complete cycle of operation of the oscillator. This sequence is repeated continuously as long as power streams are applied to ducts 23 and 29.

For the purpose of illustrating the operation of the present invention and its advantage over the prior art, it is assumed that elements 11 and 15 are logical AND gates and may, for example, be fluid amplifiers similar to amplifier 5. Element 11 receives input signals over duct 12 from any suitable source (not shown). This source may, for example, be another logical element of the fluid system. Element 11 also receives clock pulses from transmission line 3 over duct 17 and produces a fluid output signal on duct 14 during the time a signal is being applied over duct 12 concurrently with a clock pulse on duct 17.

Duct 14 is connected to element 15 which also receives clock pulses over duct 21 from transmission line 3. Element 15 produces an output signal on duct 16 only during the time it simultaneously receives a signal over duct 14 and a clock pulse over duct 21.

Figure 4:
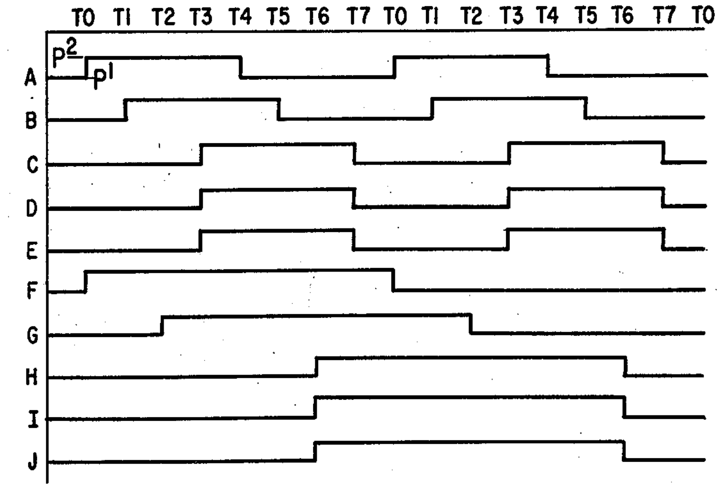
FIGURE 4 is a timing diagram illustrating the operation of the present invention.

FIGURE 4 is a waveform timing diagram illustrating the operation of the oscillator and fluid logic system shown in FIGURE 2. Each of the waveforms A through E has a lower value $P^1$ indicating the absence of a fluid pulse at a particular point at a particular instant in time and an upper value $P^2$ indicating the presence of a pulse at a particular time. It should be understood that the waveforms shown are idealized since it is obvious that pressure cannot be changed from one value to another instantaneously.

For purposes of explanation each oscillator cycle when operating under a first set of environmental conditions is arbitrarily divided into eight time periods designated T0 through T7. As shown by waveform A the pulse generator produces a clock pulse from time T0 to T4 of each cycle with no clock pulse being produced between T4 and T0. Assuming that it takes one-eighth of a cycle for a clock pulse to travel through the transmission line from the pulse generator to element 11 and cause element 11 to produce a fluid output signal, this output signal begins to occur at time T1. Waveform B represents the output signal of element 11.

At this point it must be assumed that when the logical system is constructed the characteristics of the duct 14 connecting element 11 to element 15 are chosen such that a fluid signal from element 11 arrives at element 15 at the same time as a clock pulse. Waveform C shows that the output signal from element 11 first arrives at element 15 at time T3 hence it requires two time periods for a fluid signal to travel from element 11 to element 15. Waveform D shows that clock pulses arrive at element 15 at time T3 of each cycle. Since the clock pulses are generated at the output of generator 1 beginning at time T0 of the cycle it is obvious that the clock pulses are delayed three-eighth of a cycle before they reach an input to element 15. With fluid signals being applied to both inputs of element 15 at time T3 the element begins to produce an output pulse as indicated by waveform E.

By time T4 of a cycle the leading edge of the clock pulse produced at the beginning of the cycle has traversed the transmission line and switched the power stream of amplifier 5 so that it flows into duct 35 to thereby cause the power stream of the pulse generator 1 to switch to duct 25. This terminates the production of the clock pulse for that cycle as shown by waveform A which changes from $P^2$ to $P^1$ at time T4.

As explained before, the fluid already in line 3 continues to move after the clock pulse is terminated. At time T5 this flow, which represents the latter part of the clock pulse produced during the cycle, terminates at the input of element 11 thus deconditioning this element so that it no longer produces an output pulse. As shown by waveform B the output from element 11 drops from $P^2$ to $P^1$ at time T5.

It has been assumed that there is a delay of two time periods between the time a signal is generated at the output of element 11 and the time that signal is received by element 15. Accordingly, the drop from $P^2$ to $P^1$ at the output of element 11 at time T5 does not reach element 15 until T7. This blocks element 15 and terminates the output pulse. Thus waveforms C and E change from $P^2$ to $P^1$ at T7.

Meanwhile, the clock pulse has traversed line 3 and at T7 the trailing edge reaches element 15. Thus, both inputs to element 15 are terminated at time T7.

Nothing further happens until time T0 of the next cycle. By time T0 the trailing edge of the clock pulse for the first cycle has traversed the complete length of line 3 thus terminating the control signal input to amplifier 5. This permits amplifier 5 to return to its normal state and terminate the control signal applied to pulse generator 1. When the control signal to the pulse generator is terminated its power stream again flows into duct 27 to begin producing another clock pulse.

The above illustration shows how the logical elements of a system may be controlled by the oscillator under a first set of environmental conditions. Assume now that the elements 11 and 15 are interconnected as before but that some condition of environment has changed to thus change the time it takes an output signal from element 11 to travel to the input of element 15. This change in condition might be a change in humidity or, if a liquid is used, it might be a change in temperature. The condition may be any condition which changes the characteristics such as mass, density, etc. of the fluid which must be set in motion in response to a fluid pulse.

Assume for purposes of illustration the exaggerated condition where the temperature is decreased so that a signal takes twice as long as before to travel from the output of element 11 to the input of element 15. Since the pulse generator and transmission line are also within the enclosure and subjected to the same temperature change it now takes twice as long as before for a clock pulse from the pulse generator to reach elements 11 and 15, and to completely traverse the transmission line.

Referring again to FIGURE 4 the pulse generator begins to produce a clock pulse at time T0. See waveform F. After a delay of two time periods the leading edge of this pulse conditions element 11 and the element produces an output signal beginning at time T2 as shown by waveform G. Under the assumed changed conditions it now takes four rather than two time periods for the output signal from element 11 to traverse duct 14. Therefore, the output signal is applied to one input of element 15 at time T6. This is shown by waveform H.

Reference to waveforms A and D shows that for the initial set of conditions it took three time periods for the leading edge of a clock pulse to travel from the pulse generator to element 15. Therefore, after conditions change it takes twice as long or six time periods for the clock pulse to arrive at the input of element 15. As shown by waveform I the clock pulse appears at the input of element 15 at T6 of the cycle. With both inputs receiving signals element 15 begins producing an output signal at time T6 as shown by waveform J.

As shown by waveform A the leading edge of the clock pulse completely traverses the transmission line and causes the pulse generator to stop producing the clock pulse at time T0. Since it now takes twice as long for the clock pulse to travel this path its leading edge does not arrive back at the pulse generator until the next T0 or eight time periods after it was generated. This causes the pulse generator to stop producing the clock pulse at time T0 as shown by waveform F.

Again, it takes twice as long for the condition at the output of the pulse generator to become evident at the output of element 11 and the input to element 15. Therefore, element 11 stops producing an output signal at time T2 (waveform G) and element 15 stops receiving inputs from element 11 and line 3 at time T6 (waveforms H and I). This terminates the output signal from element 15 at time T6.

At the following T0 time the trailing edge of the clock pulse has returned to amplifier 5 permitting this amplifier to return to its normal state and terminating the control signal applied to pulse generator 1. This permits the power stream of the pulse generator to again flow into line 3 as another clock pulse.

A comparison of waveforms A through E with waveforms F through J shows that each waveform of the latter group has a duration twice as great as the corresponding waveform of the first group. Waveforms A and F show that the frequency of the oscillator is twice as great with the first set of environmental conditions as with the second set. Stated differently, an oscillator cycle requires only eight time periods for the first set of conditions but requires sixteen time periods for the second set of conditions.

Of primary importance is the relative time of occurrence of each signal with reference to the beginning and end of an oscillator cycle. Note that the signals of waveform B begin at T1 and end at T5 whereas the signals of waveform G begin at T2 and end at the next T2. However, with relation to their particular oscillator cycles each begins one-eighth of a cycle after the cycle begins and ends five-eighths of a cycle after the cycle begins.

It should be understood that the above illustrations are given by ways of example only and are not intended as limitations.

Figure 3:
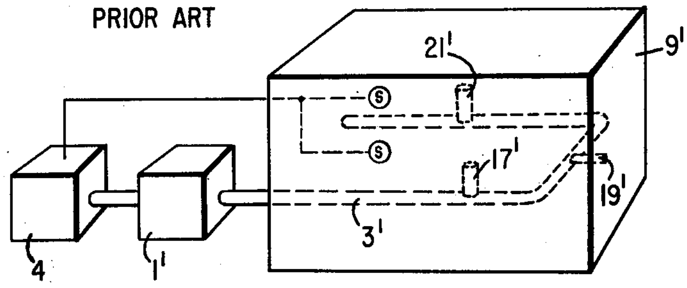
FIGURE 3 shows a typical device of the prior art.
Figure 5:
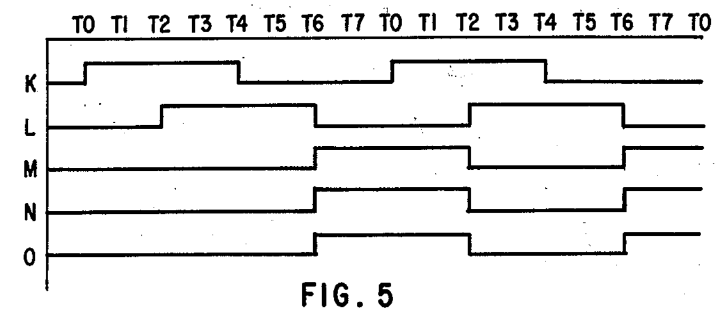
FIGURE 5 is a timing diagram illustrating the operation of the device shown in FIGURE 3.

Waveforms K, L, M, N and O of FIGURE 5 illustrate the operation of the prior art devices exemplified by FIGURE 3. Specifically, waveforms K through O represent the operation of such a prior art device during the interval between the time an environmental condition changes and the time the sensing elements sense the change.

Under a first set of environmental conditions such as those assumed for the first example given above, the operation of the prior art device is illustrated by waveforms A through E of FIGURE 4. After these conditions have changed as suggested in the second illustration above and the change has been sensed by the sensing elements to adjust the oscillator frequency the operation of the device is illustrated by waveforms F through J of FIGURE 4. However, immediately after a change of condition in the system which affects the rate of signal propagation there may be one or more cycles of the oscillator before the condition is sensed and the temperature-humidity compensator adjusts the oscillator frequency. The reason is that pure fluid logic systems may operate in the range of 10 kilocycles per second while the sensors S of FIGURE 3 cannot always sense a change in environment at the very instant that change affects the logic system. Waveforms K through O represent the oscillator output, output of element 11, input to element 15 from 11, clock pulse input to element 15, and the output of element 15, respectively, during this interval. The elements 11 and 15 are not shown in FIGURE 3 but are connected to each other and the transmission line in the same manner as shown in FIGURE 2.

Since the change in condition is not immediately sensed by the sensors to adjust the oscillator it continues to operate at the same frequency as before the change of condition. However, the change in condition has affected the rate of pulse propagation through the logic system so that the fluid signals move only half as fast. Accordingly, the outputs from the logical elements lose the relationship normally maintained with respect to the oscillator cycle. As stated before, both before and after a change of condition the present invention enables element 15 to produce a fluid output signal between three-eighths and seven-eighths of a cycle. As shown by waveform O the prior art device permits this relationship to vary so that element 15 produces a fluid output signal between three-quarters of the cycle and one quarter of the next cycle.

In normal use, element 15 might well have its output connected to one or more further logical elements, each of which receives other inputs from other logical elements. If the timing of the output signals were allowed to vary with respect to the oscillator circuit then the operation of the further logic elements would be erratic and the system would not function in the desired manner.

Figure 6:
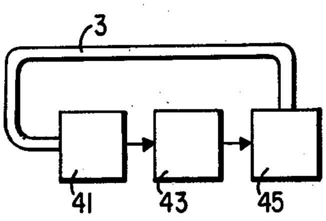
FIGURE 6 shows an alternative embodiment or apparatus for practicing the invention.

The method of controlling clock pulse generation according to the present invention is not limited to the use of the specific circuit shown in FIGURE 2. As shown in FIGURE 6, a transducer 41 may convert signals received from the transmission line 3 into electrical signals which are then amplified by an amplifier 43 of conventional design and applied to a suitable fluid valve 45 to control the application of the next clock pulse to the transmission line. Transducer 41 may be of the type shown in U.S. Patent No. 1,628,723 while the valve 45 may be any of the well known solenoid actuated control valves. Other variations in the form and detail of the devices illustrated may be made by those skilled in the art without departing from the spirit of the invention. It is intended therefore to be limited only by the scope of the appended claims.

I claim:

1. The combination comprising: an enclosure, a fluid logic system disposed within said enclosure and a device for generating timing signals for said logic system, said device comprising a feedback signal path disposed about said logic system and within said enclosure to sense environmental conditions of said logic system at diverse parts thereof and signal generator means responsive to signals received from said feedback path for applying further signals to said feedback path and timing signals to said system at a rate dependent upon the effect said sensed environmental conditions have on the velocity of signal propagation through said feedback path.

2. The combination as claimed in claim 1, said device further comprising an amplifier responsive to signals received from said feedback path for applying amplified feedback signals to said generator.

3. The combination as claimed in claim 1 wherein said signal generator generates fluid signals and said feedback path comprises a fluid signal transmission line for supplying timing pulses to said logic system.

4. The combination as claimed in claim 1 wherein changes in the environmental conditions of temperature and humidity produce changes in the rate of signal propagation along said feedback path to thus control the rate at which said timing pulses are generated.

5. The combination comprising: an enclosed digital fluid logic system; generator means responsive to input pulses for producing fluid output pulses; a fluid conducting feedback path for applying said fluid output pulses to said generator means as input pulses thereto, said fluid conducting feedback path being disposed about said logic system whereby changes in conditions affecting the rate of fluid pulse propagation in said system vary the rate of propagation of pulses through said feedback path to thereby vary the rate at which pulses are produced by said generator, and means for applying output pulses traversing said feedback path to said logic system.

6. The method of controlling an apparatus having fluid signal generator means, fluid conveying means responsive to output signals from said generator means for controlling the production of subsequent fluid output signals by said generator means, and further means responsive to said output signals, said further means and said fluid conveying means being disposed in close proximity to each other in a changeable environment, said method comprising varying the rate of signal propagation through said fluid conveying means in response to changes in the environment of said further means.

7. The method of controlling a system of fluid logic elements of the type operating under the control of fluid clock pulses, said clock pulses being produced by an oscillator of the type having a frequency controlling fluid feedback path disposed in close proximity to said logic elements, said logic system and said feedback path being surrounded by a changeable environment, said method comprising applying clock pulses to said logic system and said feedback path at a rate controlled by the effect of said environment on the rate at which said clock pulses propagate through said feedback path.

8. The combination comprising: a system of fluid logic elements disposed in a changeable environment; an oscillator for applying clock pulses to said system, said oscillator having an output frequency determined by the rate of pulse propagation through a fluid feedback path disposed in close proximity to said logic elements whereby any change of environment affecting the rate of fluid pulse propagation in said system has an immediate and corresponding effect on the rate of pulse propagation through said feedback path.

References Cited by the Examiner

UNITED STATES PATENTS

| | | | |
|---|---|---|---|
| 1,841,489 | 1/32 | Marrison | 331—41 |
| 3,016,066 | 1/62 | Warren | 235—61 |
| 3,075,548 | 1/63 | Horton | 235—61 |
| 3,091,393 | 5/63 | Sparrow | 137—8.5 |
| 3,093,306 | 6/63 | Warren | 235—61 |
| 3,107,850 | 10/63 | Warren | 235—61 |
| 3,117,593 | 1/64 | Sowers | 235—61 |
| 3,122,165 | 2/64 | Horton | 235—61 |
| 3,124,160 | 3/64 | Zilberfarb | 235—61 |

FOREIGN PATENTS

| | | |
|---|---|---|
| 674,665 | 11/63 | Canada. |
| 586,339 | 3/47 | Great Britain. |

OTHER REFERENCES

Strong, C. L.: "The Amateur Scientist," Scientific American, vol. 207, No. 2, August 1962.

LEO SMILOW, *Primary Examiner.*